United States Patent [19]

Salamon

[11] 4,185,855
[45] Jan. 29, 1980

[54] PASSIVE SEAT BELT SYSTEM

[75] Inventor: Theodore M. Salamon, Sterling Heights, Mich.

[73] Assignee: General Motors Corporation, Detroit, Mich.

[21] Appl. No.: 906,090

[22] Filed: May 15, 1978

[51] Int. Cl.$^2$ ............................................. B60R 21/10
[52] U.S. Cl. .................................... 280/804; 180/268
[58] Field of Search ...................... 280/745; 180/82 C; 297/387, 388, 389

[56] References Cited

U.S. PATENT DOCUMENTS

| 3,830,518 | 8/1974 | Silber | 280/745 |
| 3,833,239 | 9/1974 | Coenen | 280/745 |
| 3,889,971 | 6/1975 | Kazaoka et al. | 280/745 |
| 3,900,078 | 8/1975 | Otani | 280/745 |
| 3,995,884 | 12/1976 | Bauer et al. | 280/745 |

FOREIGN PATENT DOCUMENTS

| 1376292 | 2/1972 | United Kingdom | 280/745 |
| 1329808 | 9/1973 | United Kingdom | 280/745 |

Primary Examiner—David M. Mitchell
Attorney, Agent, or Firm—Charles E. Leahy

[57] ABSTRACT

A passive seat belt system includes a continuous loop of seat belt having one end connected to the vehicle body generally adjacent the shoulder of the occupant and the other end attached to the vehicle floor outboard the seat. A retractor is associated with at least one end of the belt for extending and retracting the belt. A continuous tubular track has an outboard end mounted on the roof rail generally adjacent the shoulder of the seated occupant and extends longitudinally along the roof rail, vertically along the windshield pillar, transversely along the instrument panel structure, and longitudinally along the vehicle body centerline to an inboard end located generally adjacent the inboard hip of the seated occupant. A continuous flexible helical screw is rotatably supported within the tubular track and threadedly engages a belt carriage mounted within the tubular track. The belt carriage has a belt loop extending through a continuous slot of the tubular track and slidably receives the belt. A reversible motor rotates the helical screw to move the belt loop between the outboard end of the track where the belt is retracted and stowed outboard the vehicle seat and the inboard end of the track where the lap and shoulder belts are disposed in the occupant restraining positions.

3 Claims, 3 Drawing Figures

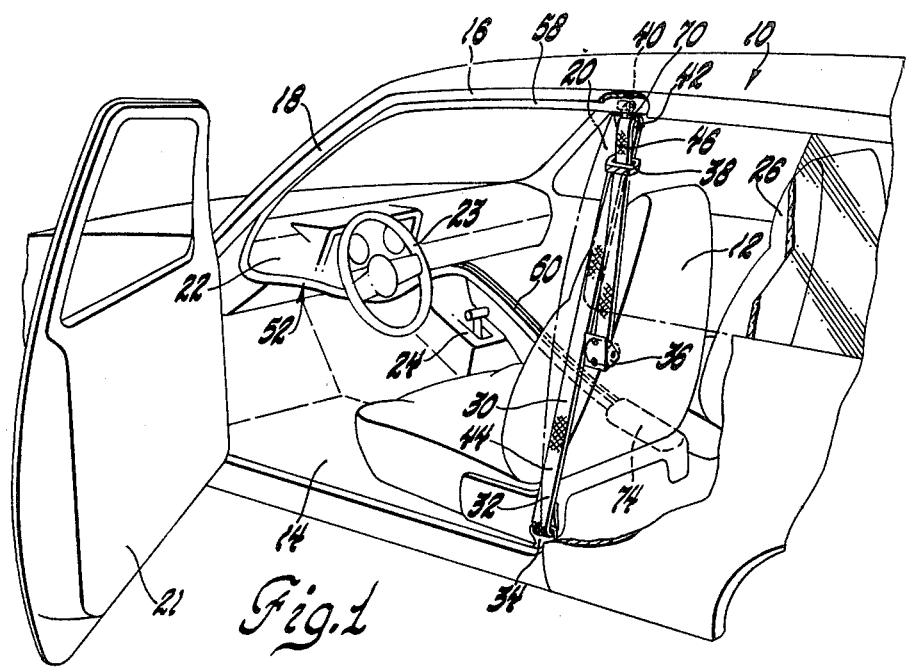
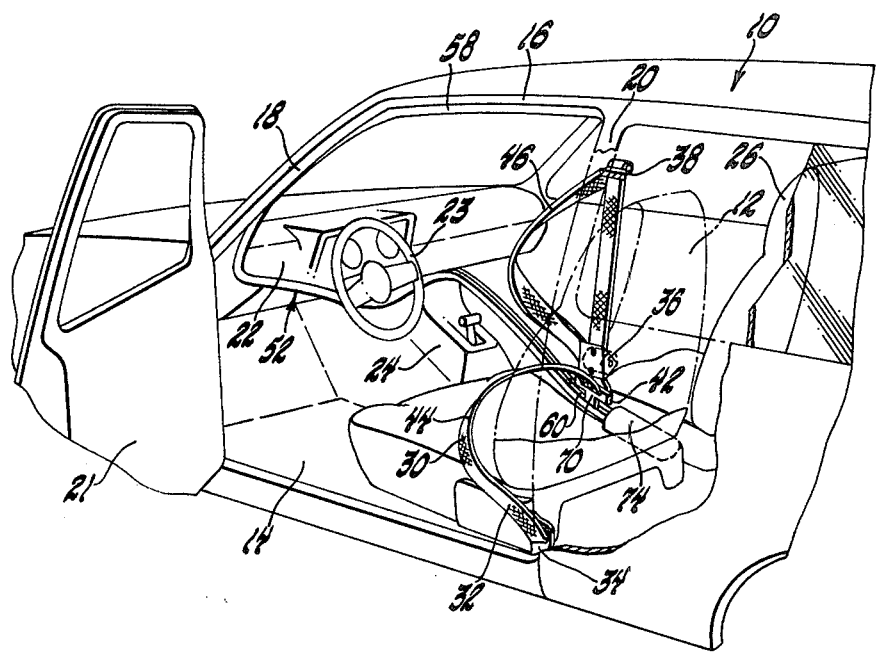
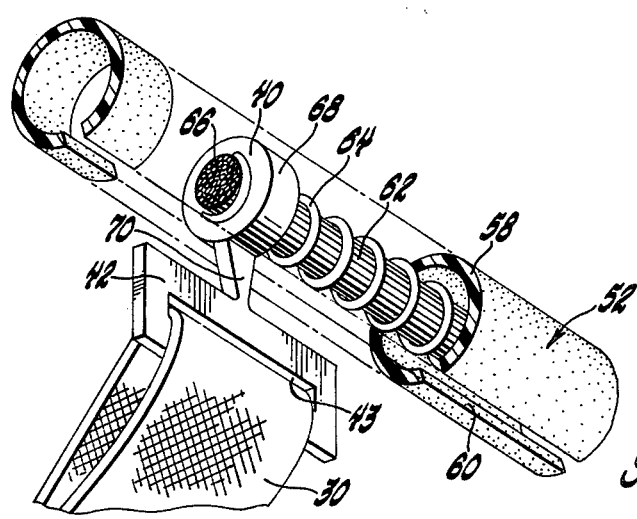

PASSIVE SEAT BELT SYSTEM

The invention relates to a passive seat belt system and more particularly to a three-point continuous-loop lap and shoulder belt system moved between the stowed and restraining positions by a motor driven track mechanism.

BACKGROUND OF THE INVENTION

It is well known to provide a three-point continuous-loop seat belt system wherein one end of a continuous loop of belt is attached to the pillar or roof rail of vehicle body by a shoulder belt retractor and the other end of the belt is anchored to the vehicle floor outboard the seat. The continuous loop of belt is divided into a shoulder belt portion and a lap belt portion by a D-ring or the like which is slidable on the belt and engageable within a buckle mounted inboard the occupant seat.

SUMMARY OF THE INVENTION

The object, feature and advantage of the present invention resides in the provision of a continuous-loop three-point belt system having associated power actuated drive means to move the D-ring from a stowed position outboard the seated occupant to an occupant restraining position engaging a buckle located inboard the seated occupant.

According to the invention, the continuous loop of seat belt has one end connected to the vehicle body generally adjacent the shoulder of the occupant. The other end is attached to the vehicle floor outboard the seat generally adjacent the hip of the seated occupant. A retractor is associated with at least one end of the belt for extending and retracting the belt. A continuous tubular track has an outboard end mounted on the roof rail generally adjacent the shoulder of the seated occupant and extends longitudinally along the roof rail, vertically along the windshield pillar, transversely along the instrument panel structure, and longitudinally along the vehicle body centerline to an inboard end located generally adjacent the inboard hip of the seated occupant. A continuous flexible helical screw is rotatably supported within the tubular track and threadedly engages a belt carriage mounted within the tubular track. The belt carriage has a belt loop extending through a continuous slot of the tubular track and slidably receives the belt. A reversible motor rotates the helical screw to move the carriage belt loop along the tubular track between the outboard end of the track wherein the belt is retracted and stowed outboard the vehicle seat and the inboard end of the track wherein the lap belt portion of the belt extends across the lap of the seated occupant and the shoulder belt portion extends across the chest of the seated occupant.

BRIEF SUMMARY OF THE DRAWINGS

These and other objects, features and advantages of the invention will become apparent upon consideration of the specification and the appended drawings in which:

FIG. 1 is a perspective view of the passive seat belt system in the stowed position;

FIG. 2 is a view similar to FIG. 1 but showing the passive seat belt system in the occupant restraining position; and FIG. 3 is an exploded view showing a typical section through the tubular track and helical screw and showing the belt carriage which moved the belt between the stowed and restraining positions.

DESCRIPTION OF THE PREFERRED EMBODIMENT

Referring to FIG. 1, there is shown a vehicle body indicated generally at 10 having a conventional driver seat 12 mounted within an occupant compartment 14. The vehicle body includes a roof rail 16, a windshield pillar 18 and a B pillar 20 which cooperate to define a door opening selectively opened and closed by a vehicle door 21. The vehicle body 10 also includes an instrument panel 22 and steering wheel 23 located forwardly of the seat and a console 24 which extends longitudinally of the vehicle along the centerline thereof between the driver seat 12 and a passenger seat 26.

Referring again to FIG. 1, it is seen that a seat belt system is provided for restraining a seated occupant within the seat 12. The seat belt system includes a continuous loop of belt 30 having a lower end 32 attached to the vehicle floor outboard the seat by an anchor plate 34. The other end of belt 30 is mounted on the pillar 20 by a conventional seat belt retracting reel 36 mounted midway on the pillar and an anchor loop 38 which slidably receives the belt 30 and is attached to the pillar 20 generally adjacent the shoulder of the seated occupant.

A belt carriage 40, to be described hereinafter, has a guide loop 42 defining a slot 43 which slidably receives the belt 30 intermediate the anchor plate 34 and the pillar mounted anchor loop 38 to divide the belt 30 into a lap belt portion 44 intermediate the anchor plate 34 and the guide loop 42 and a shoulder belt portion 46 intermediate the pillar mounted anchor loop 38 and the guide loop 42. Referring to FIG. 1, it is seen that the lap belt portion 44 and the shoulder belt portion 46 are disposed in a stowed position along the pillar 20 when the guide loop 42 is positioned at the juncture of the roof rail 16 and the B pillar 20. Referring to FIG. 2, it is seen that the lap belt portion 44 and the shoulder belt portion 46 are disposed in their respective occupant restraining positions when the guide loop 42 is positioned inboard the seat generally adjacent the hip of the seated occupant.

Referring again to FIGS. 1 and 2, it is seen that the belt guide loop 42 is moved between its FIG. 1 and FIG. 2 positions by a track mechanism generally indicated at 52. The track assembly 52 extends from a point adjacent the juncture of the roof rail 16 and the pillar 20 to a point generally adjacent the inboard hip of the seated occupant. As seen in FIG. 1, the track assembly 52 extends longitudinally along the roof rail 16, vertically down the windshield pillar 18, transversely across the instrument panel 22 beneath the steering wheel 23, and longitudinally along the centerline of the vehicle body 10. Referring to FIG. 3, it is seen that the track assembly 52 is preferably provided by a plastic tubular track 58 which has a continuous guide slot 60 extending along the length thereof. Track assembly 52 also includes a flexible helical screw member 62 which is rotatably supported within the tubular track 58. The screw member 62 includes a wire 64 which is wound in a spiral or helical fashion around a core 66. Since the track assembly is flexible, it must be supported and stiffened by its attachment directly to the various body parts or to an additional support structure.

The belt carriage 40 has a body portion 68 which surrounds the core 66 and threadedly engages the helical wire 64 so that rotation of the screw member 62 moves the body portion 68 axially along the tubular track 58. Carriage 40 has a connecting portion 70 which extends through the continuous guide slot 60 between the guide loop 42 and body portion 68.

A reversible drive motor generally indicated at 74 is provided at the inboard end of the track assembly 52 to selectively rotate the screw member 62 in either direction of rotation.

OPERATION

Referring to FIG. 1, it is seen that the track assembly 52 positions the belt guide loop 42 at the pillar 20 when the door 21 is open. When the occupant enters the seat 12 and closes the door 21, the motor 74 may be actuated by the door operated switch, the ignition switch, or other suitable indicia to occupant readiness. Rotation of the screw member 62 by motor 74 moves the guide loop 42 of belt carriage 40 forwardly along the roof rail 16, down the windshield pillar 18, and along the instrument panel 22 beneath the steering wheel 23, and rearwardly along the centerline of the vehicle to the position of FIG. 2 wherein the lap and shoulder belt portions 44 and 46 are disposed in their conventional occupant restraining position.

When the ignition is turned off or the door 21 is opened, the motor 74 is energized in the opposite direction of rotation to rotate the helical screw member 62 and move the guide loop 42 along the tubular track 58 to return the belt 30 to the stowed position of FIG. 1.

It will be understood that the retracting reel 36 winds a considerable length of belt which is adequate to reach any point along the track assembly 52. Furthermore, the continuous guide slot 60 of the tubular track 58 is preferably oriented in a direction which will at all times point the guide loop 42 toward the pillar 20 to promote free sliding movement of the belt 30 through the slot 43 of the guide loop.

It will be understood that a suitable latching arrangement is provided between the guide loop 42 and the vehicle body to maintain the belt system in the occupant restraining position of FIG. 2 during imposition of the occupant restraining loads thereagainst. A suitable latching arrangement, not shown, may include a D-ring type male connector attached to the guide loop 42 for entry into a conventional seat belt buckle mounted inboard the seat. The seat belt buckle would be released by a solenoid when the motor 74 is energized to move the belt system from the FIG. 2 restraining position to the FIG. 1 stowed position.

Thus, it is seen that the invention provides a new and improved continuous loop three-point seat belt system wherein a motor driven screw arrangement is effective to move the belt system between the stowed position and an occupant restraining position.

The embodiments of the invention in which an exclusive property or privilege is claimed are defined as follows:

1. In a motor vehicle body having an occupant seat mounted within an occupant compartment defined by a roof rail, a windshield pillar and an instrument panel structure, an occupant restraining passive lap and shoulder belt system comprising:
   a restraint belt;
   first means anchoring one end of the belt on the vehicle body outboard the occupant seat and generally adjacent the hip of the seated occupant;
   second means anchoring the other end of the belt on the vehicle body outboard the occupant seat and generally adjacent the shoulder of the seated occupant;
   a retracting means associated with one end of the belt for extension and retraction of the belt between a stowed position and an occupant restraining position;
   a continuous track means having an outboard end on the roof rail generally adjacent the shoulder of the seated occupant and extending longitudinally along the roof rail, vertically along the windshield pillar, transversely along the instrument panel structure, and longitudinally generally along the vehicle body centerline inboard the seated occupant and having an inboard end located generally adjacent the hip of the seated occupant;
   a carriage mounted on the track for movement therealong and slidably receiving the belt to define a lap belt portion between the carriage and first anchor means and a shoulder belt portion between the carriage and the second anchor means;
   and power drive means associated with the track for moving the carriage between the outboard end of the track wherein the belt is retracted and stowed outboard the vehicle seat and the inboard end of the track wherein the lap belt portion of the belt extends across the lap of the seated occupant and the shoulder belt portion extends across the chest of the seated occupant.

2. In a motor vehicle body having an occupant seat mounted within an occupant compartment defined by a roof rail, a windshield pillar and an instrument panel structure, an occupant restraining passive lap and shoulder belt system comprising:
   a restraint belt;
   lap belt anchoring means mounting one end of the belt on the vehicle body outboard the occupant seat and generally adjacent the hip of the seated occupant;
   shoulder belt retracting means mounting the other end of the belt on the vehicle body outboard the occupant seat and generally adjacent the shoulder of the seated occupant;
   a continuous track means having an outboard end on the roof rail generally adjacent the shoulder of the seated occupant and extending longitudinally along the roof rail, vertically along the windshield pillar, transversely along the instrument panel structure, and longitudinally generally along the vehicle body centerline inboard the seated occupant and having an inboard end located generally adjacent the hip of the seated occupant;
   a carriage mounted on the track for movement therealong and slidably receiving the belt to define a lap belt portion between the carriage and the lap belt anchoring means and a shoulder belt portion between the carriage and the shoulder belt retracting means;
   and power drive means associated with the track for moving the carriage between the outboard end of the track wherein the belt is retracted on the shoulder belt retracting means and stowed outboard the vehicle seat and the inboard end of the track wherein the lap belt portion of the belt extends across the lap of the seated occupant and the shoulder belt portion extends across the chest of the seated occupant.

3. In a motor vehicle body having an occupant seat mounted within an occupant compartment defined by a roof rail, a windshield pillar and an instrument panel structure, an occupant restraining passive lap and shoulder belt system comprising:

a restraint belt;

first means anchoring one end of the belt on the vehicle body outboard the occupant seat and generally adjacent the hip of the seated occupant;

second means anchoring the other end of the belt on the vehicle body outboard the occupant seat and generally adjacent the shoulder of the seated occupant;

a retracting means associated with one end of the belt for extension and retraction of the belt between a stowed position and an occupant restraining position;

a continuous tubular track having an outboard end on the roof rail generally adjacent the shoulder of the seated occupant and extending longitudinally along the roof rail, vertically along the windshield pillar, transversely along the instrument panel structure, and longitudinally generally along the vehicle body centerline inboard the seated occupant and having an inboard end located generally adjacent the hip of the seated occupant, said track having a continuous slot along the length thereof;

a flexible helical screw member rotatably supported within and extending between the outboard and inboard ends of the tubular track;

a belt carriage having a body portion captured within the tubular track and threadedly engaged upon the screw member and a belt loop portion extending through the slot of the tubular track and slidably receiving the belt to define a lap belt portion between the carriage and first anchor means and a shoulder belt portion between the carriage and the second anchor means;

and a motor for rotating the screw means to move the carriage between the outboard end of the track wherein the belt is retracted on the retracting means and stowed outboard the vehicle seat and the inboard end of the track wherein the lap belt portion of the belt extends across the lap of the seated occupant and the shoulder belt portion extends across the chest of the seated occupant.

* * * * *